Feb. 12, 1963 F. G. DA ROZA ET AL 3,077,164

STATION SELECTOR APPARATUS FOR CONVEYOR INSTALLATIONS

Filed Aug. 30, 1957 3 Sheets-Sheet 1

INVENTORS
FRANK G. de ROZA
HARRY NOWAWSKI
ADELBERT J. SCHENK
BY Farley, Forster & Farley
ATTORNEYS

STATION SELECTOR APPARATUS FOR CONVEYOR INSTALLATIONS

Filed Aug. 30, 1957 3 Sheets-Sheet 2

INVENTORS
FRANK G. da ROZA
HARRY NOWAWSKI
ADELBERT J. SCHENK
BY Farley, Forster & Farley
ATTORNEYS

STATION SELECTOR APPARATUS FOR CONVEYOR INSTALLATIONS

Filed Aug. 30, 1957 3 Sheets-Sheet 3

INVENTORS
FRANK G. da ROZA
HARRY NOWAWSKI
BY ADELBERT J. SCHENK
Farley, Forster & Farley
ATTORNEYS 3,077,164
STATION SELECTOR APPARATUS FOR CONVEYOR INSTALLATIONS

Frank G. daRoza and Harry Nowawski, Detroit, and Adelbert J. Schenk, Huntington Woods, Mich., assignors to Jervis B. Webb Company, Detroit, Mich., a corporation of Michigan Filed Aug. 30, 1957, Ser. No. 681,383
4 Claims. (Cl. 104—88)

Figure 1:
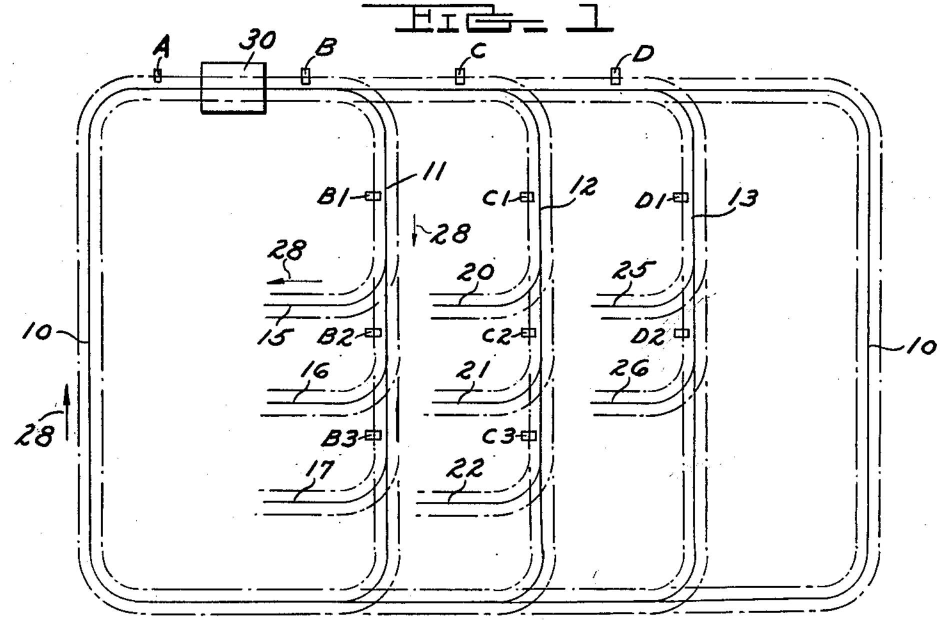

This invention relates to improved apparatus for directing a carrier of a conveyor installation to a certain station of the installation and detecting the arrival of such carrier at the station selected.

The present invention provides apparatus associated wtih each carrier for selecting a particular station or destination for that carrier, apparatus located at each station for detecting the arrival of any carrier dispatched to that station, and means for actuating some device in response to the arrival of a carrier at the station to which it has been dispatched. The device actuated may be a switch or some visual or audible indicator, or combination thereof, and actuation is produced without any physical contact between the apparatus on the carrier and the apparatus at the station.

The apparatus employed in the invention utilizes the principle of tuned oscillation circuits such as disclosed in U.S. Patent 1,797,651. The invention includes improvements in the electrical relation of apparatus of this type to obtain the degree of sensitivity required for operating conditions encountered in industrial conveyor systems. The invention also contemplates other improvements which increase the number of stations that may be provided in a given system and which result in decreasing the problem of installation and increasing the flexibility of the system as a whole.

The apparatus provided by the present invention for selectively sensing the arrival of one of a plurality of carriers at one of a plurality of stations along a conveyor comprises a carrier detector unit provided for each of the stations and mounted adjacent the path of carrier travel; a station detector or pick-up unit provided for and mounted on each of the carriers so as to pass in proximity to the carrier detector units. The carrier and station detector units each include at least one oscillation circuit with the oscillation circuit of each carrier detector unit being energized at a certain frequency. Associated with each carrier detector unit are electrical means for sensing a coupling between the energized carrier detector unit oscillation circuit and a tuned oscillation circuit of the pick-up unit of a passing carrier. Each carrier is provided with means for adjusting its pick-up unit to produce such a coupled condition at a selected station, this adjusting means including means for changing at least one of the following variables: (*a*) the resonant frequency of the oscillation circuit of the pick-up unit on the carrier; (*b*) the position of the pickup unit on the carrier or (*c*) the number of oscillation circuits required to be tuned for the selection of a particular one of a plurality of stations.

By multiplying the above variables, the number of stations can be increased to anything desired for practical purposes, and multiple signals can be simultaneously used, such as one signal for destination, and a second signal for type of load, some checking operation, loading or unloading operation, etc. The preferred electrical apparatus of the invention permits such multiplication of stations and signals with relative flexibility and low installation cost.

The improved electrical relationship of the apparatus for producing actuation of a device, such as the switch or indicating signal, in response to the momentary coupling between energized and tuned oscillation circuits, comprises a source of D.C. power, an oscillator energized thereby, a carrier detector oscillation circuit, and a link circuit for inductively connecting said oscillation circuit to the oscillator. The energized oscillation circuit of the carrier detector unit is connected to an amplifier powered from the D.C. source, through a rectifier network to give an amplifier input signal free of radio frequency effects. The circuit is arranged so that when a resonant coupling occurs between the energized oscillation circuit of the carrier detector unit and a tuned oscillation circuit of a passing carrier, a voltage drop results in the input to the amplifier.

A very sensitive circuit results from this arrangement so that a satisfactory signal can be obtained with the coils of the energized and tuned oscillation circuits passing in end-to-end relation, and at the relatively great distance apart required for the clearance necessary to prevent damage to the unit on the carrier from obstructions along the line of travel, etc. Output of the amplifier is fed through a relay which is energized by the voltage drop to produce actuation in turn, of the particular device at that station—switch, light or horn. Associated with the amplifier is a holding circuit to maintain the relay in energized condition after the input signal has returned to its normal value. This insures actuation of the device being operated by the relay, and also permits such actuation in response to more than one resonant coupling such as is required when the number of stations exceeds that selectable by the adjustment of one oscillation circuit of a pick-up unit on a carrier.

To briefly summarize the more important features of the invention: (1) Any practical numoer of stations may be provided. (2) The multiplication of electrical components is not the same as the multiplication in the number of stations, as the electrical arrangement permits one oscillation source to energize more than one oscillation circuit. (3) The only component that need be mounted adjacent the path of carrier travel is the oscillation circuit of the carrier detector units. A common and standard mounting is provided for these units. (4) Where the number of signals involved requires more than one carrier detector unit at a particular station, these can be mounted parallel to the path of travel for sequential rather than simultaneous operation. (5) Correspondingly, where multiple oscillation circuits are required for a carrier pick-up unit, the coils of such circuits can be mounted at one location on the carrier since the electrical system permits operation on sequential signals. (6) In spite of the increased sensitivity and increased operating distance between tuned and energized oscillation circuits provided, relative positions for resonant coupling between pick-up and detector coils is precise, so that selection can be obtained by a change in the position of a carrier detector unit relative to the line of conveyor travel, and by providing an adjustable mounting for correspondingly changing the relative posiiton of the pick-up unit on the carrier.

Other features and advantages of the invention will be brought out in connection with the following description of a presently preferred embodiment thereof as shown in the accompanying drawings which illustrate the invention as applied to a drive line installation such as disclosed in U.S. Patents Nos. 2,621,609 and 2,621,610, where a guide slot is formed in the carrier supporting surface, and each carrier is equipped with a depending drive pin which may be inserted in the guide slot and lowered to a position where it is engaged by a driving member secured to an endless propelling member. Installations of this type are often provided with a number stations at which a carrier may be diverted onto a branch line, manually removed from engagement with the drive line, or subjected to some other operation such as loading, checking, etc. This type of installation particularly demonstrates the utility of the invention as compared with other known station selector systems employing physical contact between mechanical or electrical selecting elements.

Figures 2, 9:
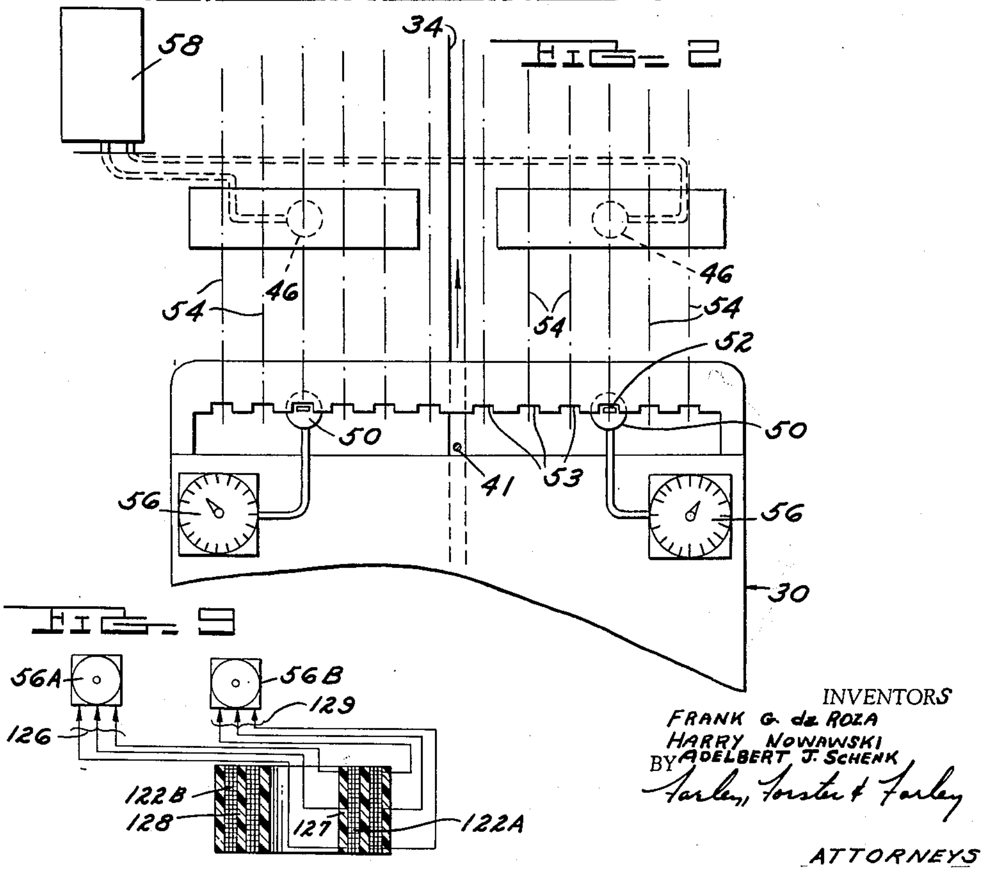
Figures 3, 4, 5:
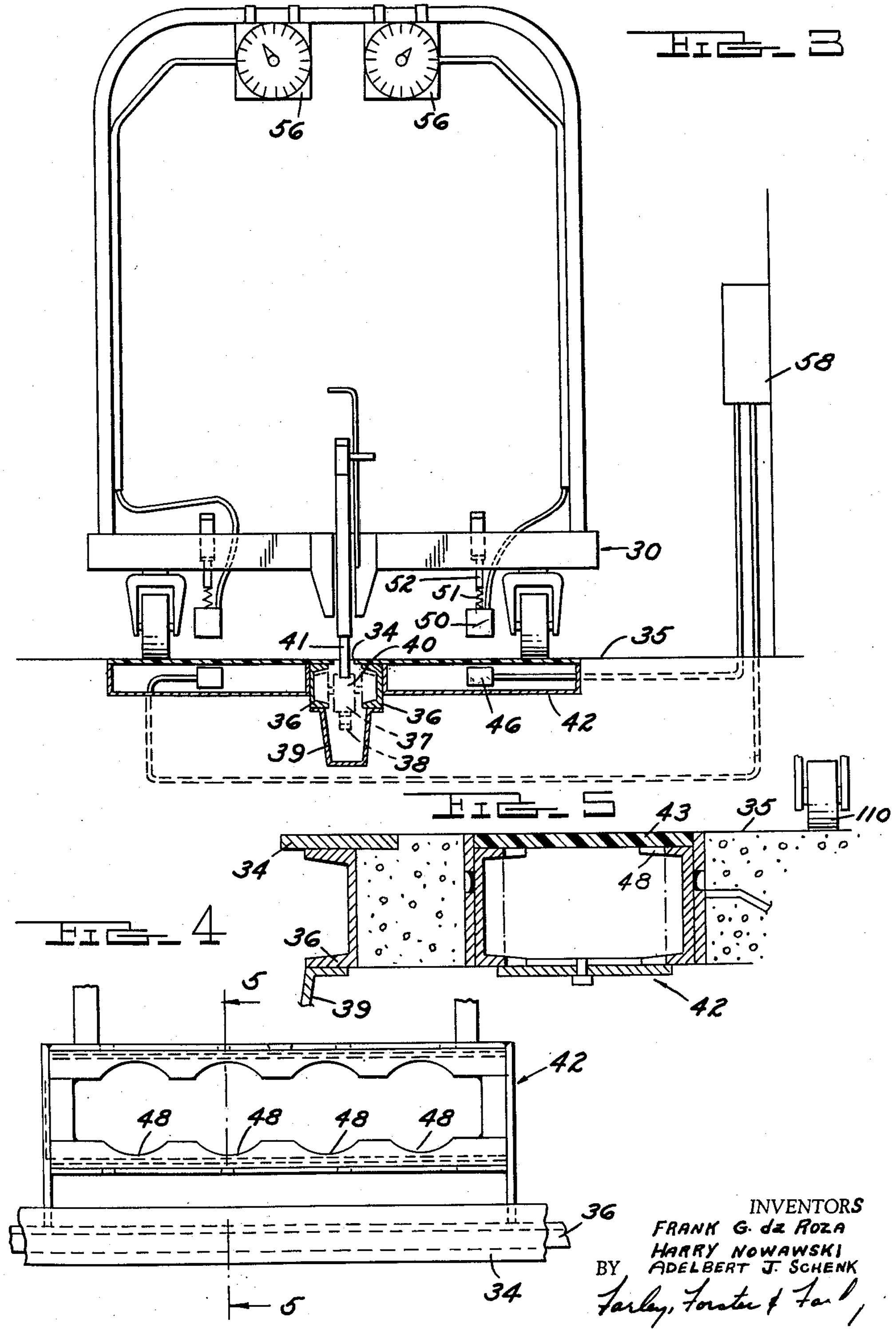
Figures 6, 7, 8:
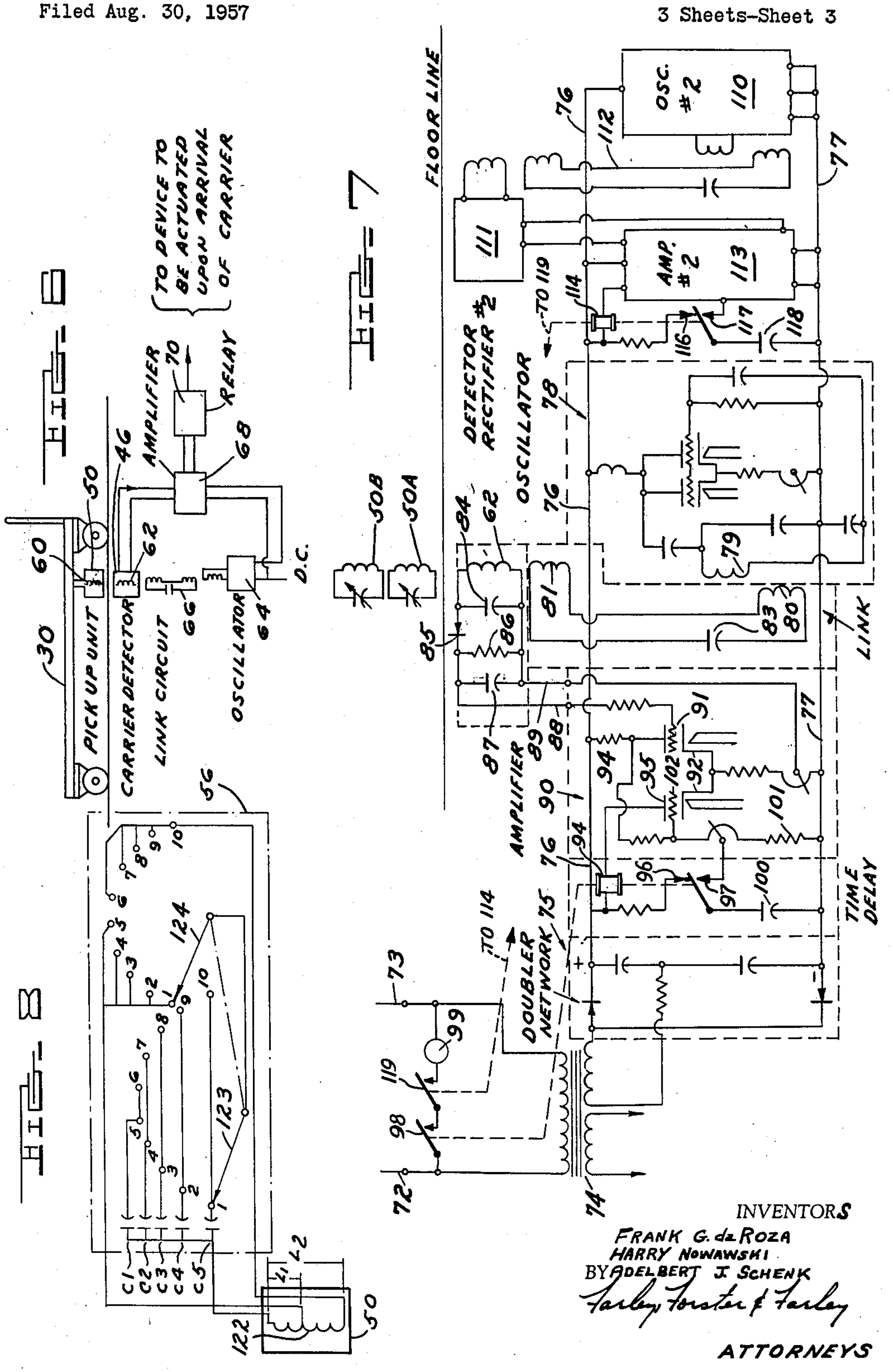

The views of the drawings are identified as:

FIG. 1, a schematic illustration, in plan, of a hypothetical drive line installation showing various stations to which a carrier may be dispatched;

FIG. 2, a schematic plan view showing a portion of a carrier, a drive slot, and the relative positioning and adjustment between carrier and station detector units;

FIG. 3, an elevation taken through a drive slot at a station showing one form of installation of the carrier and station detector units;

FIG. 4, a plan view showing an alternate type of carrier detector unit installation;

FIG. 5, a sectional elevation taken along the line 5—5 of FIG. 4;

FIG. 6, a schematic showing of the relationship between the electrical components of the system at a particular station;

FIG. 7, an electrical diagram, partly schematic, giving a detailed showing of the electrical components schematically illustrated in FIG. 6; and FIG. 8, a schematic diagram showing a multiple selection pick-up unit.

FIG. 9, a sectional elevation, partly schematic, of the construction of one type of pick-up unit.

FIGS. 1, 2 and 3 illustrate the setting of the invention and the relationship between the principal elements thereof. The drive line includes a main loop 10, a number of branch lines 11, 12 and 13, each having certain subbranch lines designated 15, 16 and 17 on branch line 11; 20, 21 and 22 on branch line 12; and 25 and 26 on branch line 15. Direction of travel of a carrier 30 (FIG. 3) around the system is indicated by arrow 28. The selection point for any particular station is indicated by the small rectangles numbered A, B, C, and D on the main line 10, B1, B2, B3 on branch line 11, C1, C2, C3 on branch line 12, and D1, D2 on branch line 13. For convenience, these points will be considered as the stations.

FIG. 3 gives a typical sectional view across the drive line at one of these stations. The drive line itself includes a guide slot 34 in the supporting surface 35 along which the carriers 30 travel. Below this guide slot are track members 36 for supporting wheeled trolleys 37 propelled by an endless chain 38 which travels in a channel 39. Certain of the trolleys 37 are equipped with a driving projection or dog 40 for engaging a vertically movable drive pin 41 mounted on the carrier 30. The carrier 30 is a conventional four wheel truck with caster type front wheels.

Each station is provided with carrier detector means mounted in a receptacle 42, which, as shown in FIGS. 4 and 5, is a rectangular box recessed in the floor so that its cover 43 forms a part of the supporting surface 35.

A carrier detector unit 46, whose electrical characteristics will be shortly described, is mounted in the receptacle 42. One or more of these detector units 46 can be mounted in any receptacle and in any one of a plurality of possible positions, such as shown by the mounting locations 48 in FIG. 4. The receptacle 42 may be positioned so that its length is perpendicular to the drive line, as shown in FIG. 3, or parallel thereto as illustrated in FIG. 4. In the perpendicular relationship of FIG. 3, a change in the mounting location of a detector unit 46 varies its position relative to the center of the drive line.

A carrier 30 is equipped with one or more station pickup units 50, each of which is preferably resiliently secured as at 51 to a supporting member 52 attached to the carrier. Member 52 may be mounted in fixed position on the carrier or may be mounted so that its position relative to the drive line center can be manually changed, as illustrated in FIG. 2, where the member 52 may be positioned selectively in any one of the notches 53 along a suitable supporting member. Such a variation in the relative position of a pick-up unit 50 produces alternate paths of travel of this member parallel to the drive line, as indicated by the lines 54 in FIG. 2.

As previously mentioned, the electrical signal required for operation of some device at a particular station, such as an indicator at station A, or switches at the other stations shown on FIG. 1, is obtained from the well known coupling effect which takes place when a tuned resonant circuit is brought into proximity to an energized oscillation circuit. The tuned resonant circuit forms part of the pickup unit 50 mounted on the carrier, and the energized oscillation circuit forms part of the carrier detector unit located at each station. Multiple station selection, in the system disclosed, can be obtained by a change in any one of three variables, or by a combination of these variables.

First, the relative position of the carrier detector units 46 can be changed with reference to the center of the guide slot 34. For example, in FIG. 2, the pick-up units 50 mounted on the carrier 30 will pass directly over the carrier detector units 46. As the coils of the oscillation circuits of the two units 50 and 46 pass in end-to-end axial relation, a coupling of the two oscillation circuits will take place (assuming that the oscillation circuit of the pick-up unit 50 is tuned to the frequency at which the oscillation circuit of the unit 46 is operating) and an electrical signal can be obtained, in a preferred manner to be later described. By definition, these two circuits are coupled if energy can be transferred from one circuit to the other. If one of the pick-up units 50 is mounted in any one of the alternate positions 53, a coupled relation of the oscillation circuits will not take place and no signal will be produced.

Second, a different frequency can be employed for energizing each of the carrier detector units 46, and the resonant circuit of the pick-up unit 50 can be tuned to any one of these frequencies, as will be described. Tuning is accomplished by the setting of a suitable indicator 56 mounted on the carrier.

Third, a plurality of detector units 46 may be included in the circuit for actuating any particular device at a station. For example, in FIG. 2, two carrier detector units are shown, and a coupled relation must be produced with each by a pick-up unit 50 on the carrier in order to produce actuation of the device controlled by the circuit schematically indicated at 58.

The number of variables employed will of course depend upon the requirements of the particular system.

The improved relationship of the electrical elements for the system is schematically illustrated in FIG. 6, and a representative circuit incorporating this relation is given in FIG. 7.

FIG. 6 illustrates a carrier passing a detector unit at any one of the stations of an installation. The coil 60 of the power absorbing resonant circuit of the pick-up unit 50 is passing the coil 62 of the energized detector unit 46 in spaced, axially aligned, end-to-end relation. Coil 62 is part of a power circuit which includes an oscillator 64. An amplifier 68 forms a power loss sensitive circuit and is supplied with a normal input signal from the carrier detector unit 62. When a coupled condition occurs between the carrier detector and pick-up units, there will be a loss in power from the energized detector circuit to the power absorbing pick-up circuit and a consequent drop in the input signal from the carrier detector unit 46 to the amplifier 68. This signal drop is employed to actuate a relay 70, which in turn controls the actuation of the switch, light, horn, or other device located at that particular station.

The circuit shown in FIG. 7 accomplishes positive, trouble free operation for industrial conveyor conditions of service where the carrier detector and pick-up unit are located a relatively great distance apart, where the field produced by the energized oscillation circuit of the detector unit must be relatively confined, where the number of frequencies obtainable from a single pick-up unit must be as great as possible, and where the installation problems for the carrier detector unit must be considered. The circuit disclosed also meets cost requirements which are particularly important as the number of stations involved in a particular installation increases.

In FIG. 7, rectified A.C. power is obtained from conventional 115 volt A.C. lines 72 and 73 through a transformer 74 and a conventional doubler network, generally indicated by the reference 75. This rectified A.C. power is fed through lines 76 and 77 to an oscillator of the Colpitts type, generally indicated by the reference 78, whose tank, or output coil is shown at 79.

A link circuit, having a coil 80 located adjacent coil 79 and a second coil 81 located adjacent the coil 62 of the carrier detector unit, inductively connects the detector unit to the oscillator output. A capacitor 83 is included in the circuit between the two link coils 80 and 81, which circuit may be of any length required to permit the oscillator to be located conveniently and remotely from the location of the carrier detector unit.

Electrically, the carrier detector unit includes the coil 62 having a capacitor 84 connected across it, and a rectifier network which includes the rectifier 85 and resistance and capacitance elements 86 and 87. This rectifier network is connected by leads 88 and 89 to the input terminals of an amplifier 90. A D.C. amplifier input signal is thereby obtained.

The amplifier is preferably a regenerative bi-stable circuit whose state depends upon the magnitude of the input voltage, and is commonly known as Schmitt trigger. It includes a dual triode, to which the output of the detector rectifier network is connected through line 88 to one grid 91 of this tube, and through line 89 to both cathodes 92 thereof.

Output of the amplifier 90 controls the energization of a relay 94, which is shown connected to one of the anodes 95 of the tube. Relay 94 controls a normally closed contact 96 and a normally open contact 97 both forming part of a holding circuit shown at the left of the amplifier, and a normally open contact 98 connected in series with the device being actuated, 99, across the A.C. powerline 72 and 73. The holding circuit which includes contacts 96 and 97 maintains the relay energized an interval beyond the momentary time the signal from the detector rectifier network is active in response to the passing of a carrier bearing a tuned pickup unit 50A. This holding circuit has two functions, first, it insures operation of the device controlled by the relay in response to a momentary signal, and second, it provides time for actuation of the device 99 in response to coupling between a second set of pickup and carrier detector units. Normally closed contact 96 connects a capacitor 100 to the powerlines 76 and 77. When relay 94 is energized contact 96 is opened and normally openend contact 97 closes, connecting the capacitor 100 to discharge through the resistance 101 to maintain the second grid 102 of the dual triode tube conductive, thereby maintaining relay 94 energized during the time capacitor 100 is discharging.

FIG. 7 also illustrates the use of multiple input signals for controlling operation of the actuated device 99. A second set of circuit elements, similar to those just described, is schematically illustrated, including a second oscillator 110 driving a detector rectifier unit 111 through a link circuit 112, with output from the detector rectifier unit 111 connected to a second amplifier 113, including a second relay 114, having normally closed and normally open contacts 116 and 117 in a holding circuit including capacitor 118, and a normally open contact 119 in series with the supply to device 99. Relay 114 will be energized in response to a coupling between detector 111 and a second tuned pickup unit 50B.

FIG. 8 shows one type of electrical relationship that may be employed for tuning the resonant circuit of a pick-up unit to a number of resonant frequencies with a minimum number of parts. Two values of inductance $L_1$ and $L_2$ are obtained from the coil 122 of the pick-up unit 50. Two rotary contacts 123 and 124 are incorporated in the selector 56. Five different values of capacitance C1 to C5 are connected to terminals 1 to 5 of contact 123, and by jumper connections to terminals 6 to 10 thereof. Inductance $L_1$ is connected to terminals 1 to 5 of contact 124 and inductance $L_2$ to terminals 6 to 10 thereof. Thus, in position 1 to 5 of the selector, inductance $L_1$ is successively placed in series with each of the capacitance values C1 to C5, and in positions 6 to 10 inductance $L_2$ is similarly connected.

Two pick-up units may be provided in a single housing as shown in FIG. 9. Coil 122A is wound on a core 127, and may be connected to supply two values of inductance to selector 56A as indicated by the three leads 126. Coil 122B is wound on a concentric core 128 and is separately and similarly connected to selector 56B by leads 129. The assembly is completed by a casing 130 and may be mounted in the manner shown in FIG. 3 for the pick-up units 50, as previously described. Since a relatively large number of selections can be obtained from this type of construction a variable mounting position will not have to be employed for most installations.

This dual pick-up unit construction results in the sequential signal type of operation at a station employing two detector units which will be installed in line in the direction of carrier travel as previously described and illustrated in FIGS. 4 and 5.

Twenty different frequencies can easily be employed and tuned by a single pick-up unit, and a second set of twenty frequencies can be provided with the dual pick-up unit construction. With the combinations available from such a unit, four hundred different signals can be used. A minimum of forty oscillators will be required, one for each of the frequencies, with all carrier detector units using a certain frequency being energized through link circuits from the oscillator supplying that frequency. Numerically, a minimum number of components are needed for a given number of selections, and the construction and arrangement provided for these components gives operational results and features not obtainable from other systems utilizing physical contact between mechanical or electrical sensing elements to provide a selection, and at a cost which is comparable or even more favorable, depending on the requirements of a particular installation.

The foregoing description is intended to be representative and illustrative of the invention, which embraces modifications within the scope of the following claims.

We claim:

1. A station selector system for carriers of a conveyor installation of the type wherein a signal for actuating a device is obtained upon the arrival of a carrier at the station selected from a resonant coupling between a non-energized resonant circuit of a pick-up unit mounted on the carrier and a detector unit located at the station; characterized by:

(*a*) said detector unit including at least one oscillation circuit, (*b*) means for energizing said oscillation circuit at a certain frequency through an impedance, (*c*) said detector unit oscillation circuit comprising a coil and a capacitance connected in parallel and tuned to said frequency, (*d*) bi-stable circuit means whose state depends upon the magnitude of an input signal for sensing a resonant coupling of said pick-up unit with said detector unit and for producing said actuating signal in response to such resonant coupling, (*e*) and means connecting said energized oscillation circuit to said bi-stable circuit to supply the signal resulting across the tuned coil and capacitance of the oscillation circuit as a normal input signal for maintaining said bi-stable circuit in one state whereby said bi-stable circuit changes to its other state in response to a drop in said input signal resulting from said resonant coupling.

2. A station selector system according to claim 1 further characterized by the connecting means of clause (*e*) including a rectifier network to supply a D.C. input signal to said bi-stable circuit.

3. A station selector system according to claim 1 further characterized by a relay connected to said bi-stable circuit means for energization in the said other state thereof and means controlled by said relay for maintaining the energization thereof for an interval after said input signal has returned to its normal value.

4. A station selector system according to claim 1 further characterized by the said energizing means of clause (*b*) comprising an oscillator having an output coil, said impedance including a link circuit inductively connecting said oscillator output coil to said detector unit oscillation circuit coil.

References Cited in the file of this patent

UNITED STATES PATENTS

| | | |
|---|---|---|
| 1,243,457 | Stuart | Oct. 16, 1917 |
| 1,797,651 | Gergacsevics et al. | Mar. 24, 1931 |
| 1,797,864 | Harlandt | Mar. 24, 1931 |
| 2,241,906 | Griffiths | May 13, 1941 |
| 2,492,388 | Martin | Dec. 27, 1949 |
| 2,537,298 | Baughman | Jan. 9, 1951 |
| 2,621,609 | McCaul et al. | Dec. 16, 1952 |
| 2,621,610 | Boyko et al. | Dec. 16, 1952 |
| 2,673,292 | Treharne | Mar. 23, 1954 |
| 2,688,931 | Spafford | Sept. 14, 1954 |
| 2,688,932 | Heil | Sept. 14, 1954 |
| 2,688,933 | Spafford | Sept. 14, 1954 |
| 2,731,551 | Stafford | Jan. 17, 1956 |
| 2,753,550 | Treharne | July 3, 1956 |
| 2,790,071 | Gunn | Apr. 23, 1957 |
| 2,803,333 | Freeman | Aug. 20, 1957 |
| 2,816,516 | Diehl | Dec. 17, 1957 |
| 2,828,480 | Golladay | Mar. 25, 1958 |
| 2,930,888 | Grawford | Mar. 29, 1960 |